United States Patent [19]

Melinat

[11] 4,445,330

[45] May 1, 1984

[54] MASTER CYLINDER ASSEMBLY AND BOOSTER

[75] Inventor: Wolfgang Melinat, Dayton, Ohio

[73] Assignee: General Motors Corporation, Detroit, Mich.

[21] Appl. No.: 279,743

[22] Filed: Jul. 2, 1981

[51] Int. Cl.³ .............................................. F15B 7/00
[52] U.S. Cl. ..................................... 60/545; 60/547.1; 60/562; 60/585
[58] Field of Search ...................... 60/545, 547.1, 562, 60/585, 589

[56] References Cited

U.S. PATENT DOCUMENTS

| | | | |
|---|---|---|---|
| 2,069,578 | 2/1937 | Eaton | 60/545 |
| 2,657,537 | 11/1953 | Oakley | 60/589 |
| 3,285,010 | 11/1966 | Davis | 60/562 |
| 3,310,944 | 3/1967 | Bauman | 60/562 |
| 4,152,897 | 5/1979 | Falk | 60/589 |
| 4,206,605 | 6/1980 | Mehren | 60/562 |
| 4,225,022 | 9/1980 | Belart | 60/562 |
| 4,283,911 | 8/1981 | Nakamura | 60/547.1 |
| 4,307,570 | 12/1981 | Yardley | 60/547.1 |
| 4,400,943 | 8/1983 | Belart | 60/562 |

FOREIGN PATENT DOCUMENTS 2335530  1/1974  Fed. Rep. of Germany ........ 60/585

*Primary Examiner*—Abraham Hershkovitz
*Attorney, Agent, or Firm*—D. D. McGraw

[57] ABSTRACT

A short master cylinder uses solenoids to control the master cylinder compensating and bypass functions. The pressurizing pistons each use only one seal. There is a unitary primary piston and booster output push rod. The booster power piston return spring returns the primary piston and, through a lost motion interconnection, the secondary piston, omitting the secondary piston spring. Brake pedal travel and pressure sensors control the solenoid valves, reducing lost brake pedal travel.

6 Claims, 2 Drawing Figures

MASTER CYLINDER ASSEMBLY AND BOOSTER

The invention relates to a master cylinder assembly which has a short axial length, and also relates to a booster assembly combined with the master cylinder assembly so that certain booster portions also serve as portions of the master cylinder assembly. The short overall length of the master cylinder housing is obtained by using short single-sealed primary and secondary pistons which are interconnected with a lost motion mechanism, the primary piston being a unitary member with the output member of the booster assembly. The master cylinder compensating and bypass functions are controlled by power devices such as solenoids which are in turn controlled by brake pedal actuation and release. The ports, passages and valves accomplishing compensation and bypass functions are positioned in master cylinder housing sections formed transversely of the master cylinder bore section so that only one port need be provided in each pressurizing chamber, requiring a minimal axial length to accommodate the compensation and bypass functions. Controls for these functions are positioned on the side of the bore section so that they do not contribute any additional required axial length of the bore section. The transverse sections of the master cylinder housing also provide mounting bosses for a multiple chambered brake fluid reservoir attached to and mounted above the master cylinder housing. The preferred arrangement illustrated uses normally closed check valves which prevent flow from the master cylinder pressurizing chambers to the reservoir when closed. Spring loaded valve operating plungers open the valves and hold them open so long as the solenoids are deenergized, permitting fluid communication between the reservoirs and the pressurizing chambers and the brake circuits served by them. The solenoids are energized, upon actuating movement of the brake pedal, to withdraw the valve opening plungers and allow the check valves to seal the pressurizing chambers relative to the reservoir chambers so that fluid pressurization can begin with minimal brake pedal movement.

Assemblies embodying the invention provide for weight reduction and also occupy smaller packaging space within vehicles. Since the current trend in automotive design is to develop lighter weight and smaller vehicles, these characteristics are of particular importance. In its preferred embodiment the master cylinder would be made of aluminum with aluminum, titanium or steel pressurizing pistons, a plastic reservoir housing and cover, and a shortened brake booster to master cylinder arrangement. By unitizing the booster output push rod and the master cylinder primary piston and providing limited lost motion between the primary and secondary pressurizing pistons, the brake booster power return spring can be used as the return spring for the secondary piston, eliminating the requirement and space needed for a secondary piston return spring in the master cylinder bore, resulting in further reduction in master cylinder overall length. In the preferred embodiment illustrated, the compensation and bypass functions are controlled by electrically operated solenoids. The invention includes the concept of utilizing other valve actuating arrangements.

IN THE DRAWING

Figure 1:
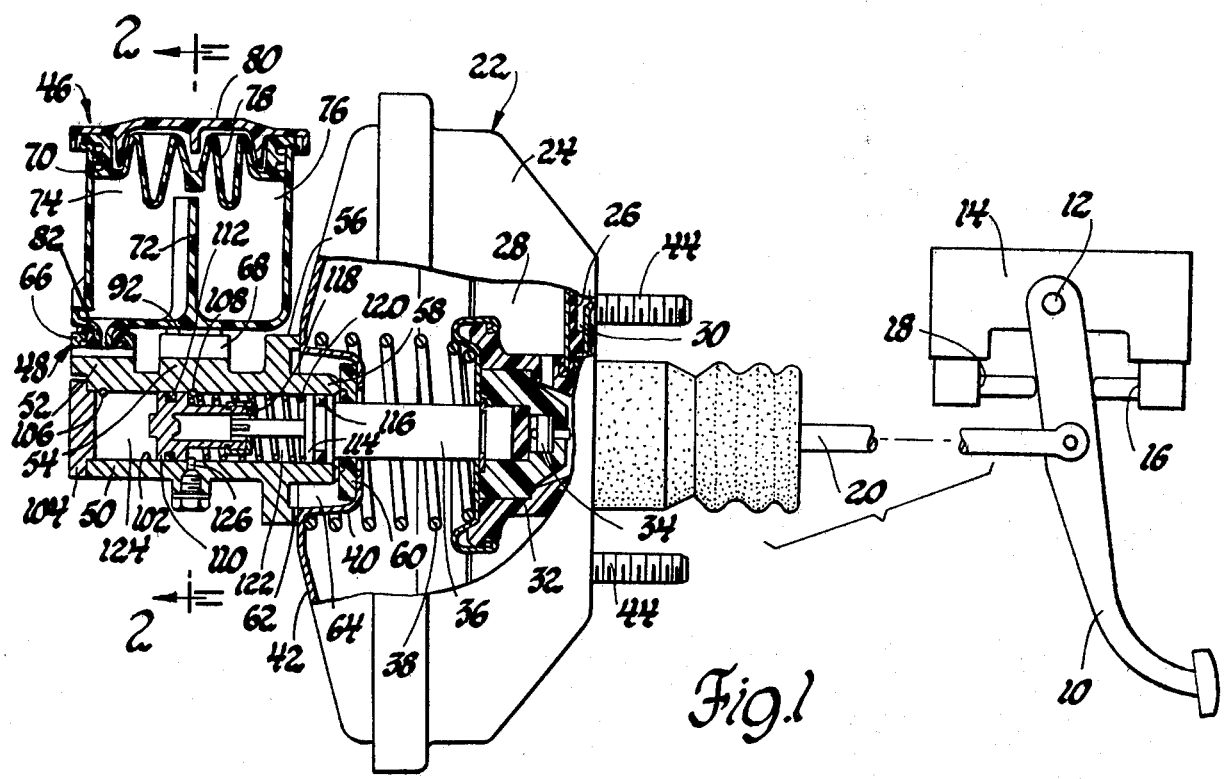
FIG. 1 is an elevation view of a portion of a vehicle brake system including a brake pedal, a brake power booster, and a master cylinder assembly, with parts broken away and in section.

The vehicle brake system is illustrated as including a brake pedal 10 pivotally mounted at 12 on a suitable fixed portion 14 of the vehicle in which the system is installed. At rest, the brake pedal 10 contacts a sensor 16 sensing the brake pedal rest position, and another sensor 18 also sensing the brake pedal rest position. Sensor 16 may be a piezoelectric pressure sensor and sensor 18 may be a Hall-effect travel sensor.

The brake pedal is connected to move a push rod 20 for actuation of the valve mechanism of the power brake booster assembly 22. Although details of the valve mechanism are not illustrated and are not pertinent to the invention, it is recognized that a suitable valve arrangement such as that commonly used on power brake boosters is provided. The booster assembly 22 is illustrated as being a vacuum suspended power brake booster having a housing 24 divided by a power wall 26 into a vacuum chamber 28 and a variable pressure chamber 30. The power wall 26 includes a booster piston assembly 32 which may contain the booster control valve mechanism and a suitable reaction device 34, and which is connected to a booster output member 36. A booster power wall return spring 38 is positioned in chamber 28 with one end acting against the piston assembly 32 and the other end fitting over an inwardly disposed crown section 40 of the forward wall 42 of booster housing 24 so that the forward spring end reacts against forward wall 42 and is held in place by the extension of crown section 40 into the spring. The booster housing 24 is provided with a mounting arrangement such as mounting bolts 44 for mounting the booster assembly in the vehicle engine compartment on the forward side of the fire wall. A suitable vacuum supply, not shown, is connected to chamber 28 to maintain the booster in vacuum suspended condition.

The master cylinder assembly 46 includes a housing 48 provided with an axially extending bore section 50 and a pair of axially spaced transverse sections 52 and 54 positioned on the upper side of the bore section. The bore section also has a mounting flange 56 adjacent the rear end 58 so arranged that the rear end 58 extends into the recess defined by crown 40, engaging and retaining a booster seal 60 while the flange 56 engages the forward surface of booster forward wall 42 radially outward of the crown 40, and is suitably attached to the booster. This arrangement also contributes to reduced overall length of the entire booster and master cylinder assembly. The bottom portion of flange 56 is provided with a vent 62 so that the chamber 64 within crown section 40 is vented to atmosphere.

Transverse sections 52 and 54 have mounting bosses 66 and 68 on the upper portions thereof which provide for the mounting of the reservoir body 70. The reservoir body may be made of a suitable plastic material such as reinforced nylon. It has a divider wall 72 formed therein dividing the reservoir into chambers 74 and 76. A diaphragm seal 78 and reservoir cover 80 seal the chambers 74 and 76. The bottom of reservoir 70 is provided with a pair of spigots 82 and 84, one of which is better illustrated in FIG. 2. As shown in that Figure, spigot 84 extends downwardly from the bottom 86 of the reservoir 70 and has a port or passage 88 formed therethrough. The lower end of spigot 84 has a flange 90 which cooperates with a retaining seal 92 and a mounting boss flange 94 to secure the reservoir 70 in place on the housing 48. Mounting boss 68 has an enlarged passage section 96 into which the port 84 opens. A port or passage 98 connects passage section 96 with a chamber 100 provided within transverse section 54 to be further described. The same arrangement is provided with spigot 82, mounting boss 66 and transverse section 52.

Bore section 50 has a bore 102 extending axially therethrough, the forward end of which is closed by a bore plug 104. The rear end of bore 102 opens through the master cylinder housing section rear end 58. Compensation and bypass ports 106 and 108 extend transversely of the bore 102 so that they respectively intersect the bore, as better shown in FIG. 2, in axially spaced relation. They take up a minimal amount of axial space, so the axial length of bore 102 need not be extended for their accommodation. A secondary pressurizing piston 110 is reciprocably received in the forward portion of bore 102 and has a single piston seal 112. A primary pressurizing piston 114 is received in the rear portion of bore 102 and also has a single seal 116. Pistons 110 and 114 are connected by a suitable interconnecting lost motion mechanism 118 which permits relative closing movements of the pistons but limits the amount of separation that the pistons may obtain to a predetermined distance so that the pistons are separated by this amount while the master cylinder is at rest and in the released position illustrated in FIG. 1. A primary pressurizing piston return spring 120 is contained in the primary pressurizing chamber 122 defined by pistons 110 and 114 and extends circumferentially about the mechanism 118. The compressive force of spring 120 continually urges pistons 110 and 114 axially apart toward the separation limit established by mechanism 118. A secondary pressurizing chamber 124 is defined forwardly of piston 110 between that piston and bore plug 104. The arrangement is such that secondary piston 110, in the rest position, remains clear of port 108 and that port is always connected to chamber 122. A secondary piston stop 126 assures this precise position. Port 106 is located adjacent and immediately to the rear of bore plug 104 so that it is always in open communication with secondary pressurizing chamber 124. The brake booster output member 36 is a unitary part of the primary pressurizing piston 114 and is arranged to be reciprocably sealed by booster seal 60.

Figure 2:
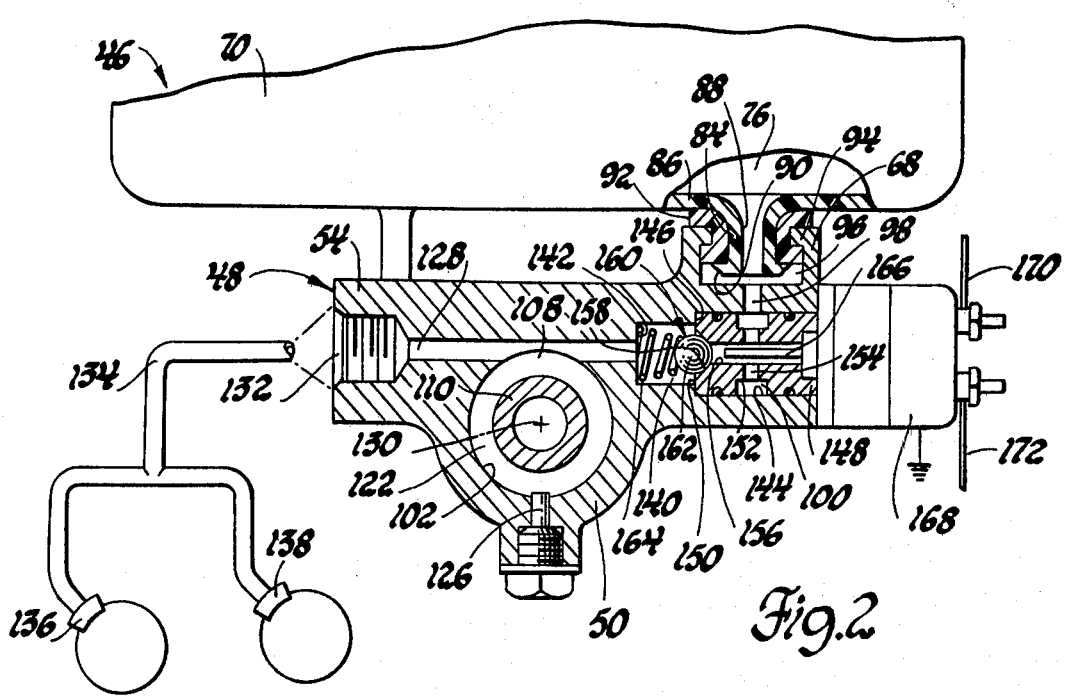
FIG. 2 is a cross section view taken in the direction of arrows 2—2 of FIG. 1, having parts broken away and portions of the vehicle brake system illustrated schematically.

Transverse sections 52 and 54 are similarly constructed and therefore only transverse section 54, illustrated in FIG. 2, will be further described. Transverse section 54 includes a passage 128 extending perpendicularly skew to the axis 130 of bore 102 so that it tangentially intersects the bore to provide port 108. The end 132 of passage 128, as seen in FIG. 2, extends outwardly of the transverse section 54 and is connected to a brake line 134 of one brake circuit of the vehicle. Brake line 134 is schematically illustrated as being connected to the vehicle front wheel brakes 136 and 138 of a typical split brake system. While illustrated as a front and rear split system, other split arrangements may be used, or the brake circuit being served by brake line 134 may lead to the vehicle rear brakes. It should be recognized that another brake circuit of similar construction and arrangement is provided in relation to port 106, but is not shown.

Passage 128 has a first enlarged section 140 defined in part by shoulder 142 and a second enlarged section defining the other passage end 144 and defined in part by shoulder 146 separating section 140 and passage end 144. A valve body 148 is positioned in passage end 144 so that one end 150 abuts shoulder 146. The valve body 148 is constructed as a spool with a reduced diameter center portion 152 defining annular chamber 100. A cross passage defines a port 154 within the center reduced portion 152. A valve body bore 156 extends axially of the valve body, is intersected by port 154, and terminates at valve body end 150 in the form of a valve seat 158. A check valve 160 is contained within the passage section 140 and passage end 144. Valve 160 is formed by valve seat 158 and a valve ball 162. The valve ball 162 is continually urged into seating engagement with valve seat 158 by a light valve spring 164 acting on the ball and reacting on shoulder 142. Thus check valve 160 tends to prevent flow from port 108 into valve body bore 156 and reservoir chamber 76.

A spring loaded plunger 166 is reciprocably received in valve body bore 156. The plunger is spring loaded toward valve ball 162 and, when not otherwise prevented, will hold the valve ball away from its seat 158, maintaining fluid communication between reservoir chamber 76 and pressurizing chamber 122. A portion of plunger 166 forms an armature for a solenoid assembly 168, which is secured to the transverse section 54 over passage end 144 and holds the valve body 148 in place in passage end 144. Electrical energization of the solenoid of assembly 168 will cause the plunger 166 to move rightwardly to the position illustrated in FIG. 2, allowing the valve ball 162 to seat against valve seat 158 and prevent fluid flow or pressure from passing through the valve seat. Electrical leads 170 and 172 are schematically illustrated in connection with solenoid assembly 168 and are respectively connected to the sensors 16 and 18 in such a manner that when brake pedal actuating travel is sensed by sensor 16 (as the piezoelectric pressure changes to zero) or when travel is sensed by the Hall-effect sensor 18 as the sensor plunger is moved by the brake pedal 10, the solenoid 168 is activated to retract plunger 166 into the solenoid. This arrangement results in the closure of check valve 160 when any brake pedal movement is sensed, and uses redundant sensors to assure such activation of the solenoid. Thus lost piston travel of the master cylinder to close off compensation and bypass ports is virtually eliminated and lost pedal travel is considerably reduced. It is to be understood that the same arrangement is provided with regard to transverse section 52 and port 106 as well as reservoir chamber 74, the solenoid assembly controlling the check valve for port 106 being actuated simultaneously with solenoid 168, which is associated with port 108.

Both check valves remain closed during master cylinder actuation as pressure is applied and as the brake actuating pressure is released until the brake pedal 10 activates the Hall-effect sensor 18 or the piezoelectric pressure sensor 16. Such brake pedal releasing movement actuating either sensor will cause deenergization of both solenoids at the same time, so that, as seen in FIG. 2, spring loaded plunger 166 and its counterpart in the other transverse section 52 will engage the respective valve balls and move them to the open position, opening the brake fluid passages from the primary and secondary pressurizing chambers into the reservoir chambers for the release of the residual brake fluid pressures in the pressurizing chambers. During brake release, small amounts of brake fluid may be drawn from the reservoir chambers into the pressurizing chambers around the check valve balls 162 by negative pressure increments which are sufficient to overcome the valve spring 164, speeding up the release movement of the secondary pressurizing piston 110 and the primary piston 114 and booster output member 56.

The mechanism embodying the invention provides for a very short master cylinder, control of the compensating and bypass functions without master cylinder pressurizing piston stroke loss, the simplification of the primary piston and the booster output member resulting in further shortening of the overall assembly, and the elimination of parts including various seals and a secondary piston return spring.

The embodiments of the invention in which an exclusive property or privilege is claimed are defined as follows:

1. A master cylinder assembly having the characteristic of a short overall axial length and including compensation valve mechanism actuatable without lost brake pedal travel in the axial direction normally required to move pressurizing pistons to close and open compensation valves, said master cylinder assembly comprising:

a housing having a bore section provided with a bore extending axially therein and containing first and second pressurizing chambers and first and second pressurizing pistons axially movable in said bore, each of said pistons having a single seal continuously reciprocably sealing said pistons relative to the wall of said bore so as to require a short overall piston axial length and consequently contribute to the short overall master cylinder length, first and second housing sections extending laterally outward from and transverse to said master cylinder assembly housing bore section so as not to extend the overall axial length of said master cylinder assembly, said first and second transverse housing sections respectively having first and second passages therein, each of said passages extending into said housing bore section and transversely intersecting one of said pressurizing chambers, each of said passages having one end adapted to be connected to a brake circuit, first and second reservoir mounting bosses respectively on said first and second transverse housing sections at laterally outward locations relative to said housing bore section and respectively having third and fourth passages transversely intersecting the other ends of said first and second passages within said first and second transverse housing sections, a brake fluid reservoir mounted on said bosses and having first and second ports in respective brake fluid communication with said third and fourth passages, and first and second normally closed valves respectively in said first and second passages fluidly between said pressurizing chambers and said third and fourth passages;

and means including first and second valve operator means respectively positioned externally on said first and second transverse housing sections and operable in response to brake pedal actuation and release for closing and opening said first and second valves in a manner that said valves are closed when said valve operator means operate in response to brake pedal actuation and are opened when said operator means operate in response to brake pedal release, the positioning of said valves and said valve operator means on said transverse housing sections instead of said bore section in cooperation with the response of said valves to brake pedal actuation and release rather than axial movement of said pistons further contributing to the short overall axial length of said master cylinder assembly.

2. In a brake operating assembly, a brake pedal and a master cylinder and a brake booster, said master cylinder comprising:

a housing with a bore therein defining a cylinder, first and second pressurizing pistons reciprocably received in said cylinder and defining therewith a primary pressurizing chamber between said pistons and a secondary pressurizing chamber forward of said second piston, a first piston return spring acting between said pistons and being the only piston return spring in said cylinder, means limiting separative movement of said pistons, a stop extending into said cylinder and engageable with said second piston to limit rearward movement of said second piston, first and second ports respectively continuously connected with said primary and secondary pressurizing chambers and adapted for respective connection to first and second brake circuits, a brake fluid reservoir having first and second port means respectively communicating with said first and second ports, said first and second port means each having a normally closed check valve therein which when closed resists brake fluid flow from said reservoir to said respective pressurizing chambers and prevents brake fluid flow from said respective pressurizing chambers, means for holding said check valves closed during brake pedal operation for braking action and for opening said valves and holding said check valves open during brake pedal rest at full brake release, and operating means for said last-named means including solenoids energizable and deenergizable respectively in response to initial brake pedal brake operating movement before any pressurizing piston movement is evident and return of the brake pedal to the full brake release position after the pressurizing pistons have returned to their maximum allowable rearward movement positions;

said brake booster having a power wall, an output member formed by said primary piston and secured to said power wall, and a power wall return spring which acts through said power wall and said booster output member upon brake releasing operation to move said pistons to their brake release positions with said second piston engaging said stop and to operatively move said brake pedal to the brake release pedal rest position and deenergize said solenoids.

3. In a brake operating assembly having a short overall length booster and master cylinder arrangement, a brake pedal and a master cylinder and a brake booster, said master cylinder comprising:

a housing with a bore therein defining a cylinder, first and second pressurizing pistons reciprocably received in said cylinder and defining therewith a primary pressurizing chamber between said pistons and a secondary chamber forward of said second piston, each of said pistons having a single seal continuously sealing said piston relative to the wall of said bore so as to require a short overall piston axial length and permitting said primary chamber to extend axially immediately adjacent one bore end when the master cylinder is in the released position and consequently contributing to the short overall length of the booster and master cylinder arrangement, a first piston return spring acting between said pistons and being the only piston return spring in said cylinder, means limiting separative movement of said pistons, a stop extending into said cylinder and engageable with said second piston to limit rearward movement of said second piston, first and second ports respectively continuously connected with said primary and secondary pressurizing chambers and adapted for respective connection to first and second brake circuits, a brake fluid reservoir having first and second port means respectively communicating with said first and second ports, said first and second port means each having a normally closed check valve therein which when closed resists brake fluid flow from said reservoir to said respective pressurizing chambers and prevents brake fluid flow from said respective pressurizing chambers to said reservoir, means for holding said check valves closed during brake pedal operation for braking action and for opening said valves and holding said check valves open during brake pedal rest at full break release, and operating means for said last-named means including solenoids energizable and deenergizable respectively in response to initial brake pedal brake operating movement occurring before any pressurizing piston movement is evident and return of the brake pedal to the full brake release position;

said brake booster having a power wall, an output member formed by said primary piston and secured to said power wall, and a power wall return spring which acts through said power wall and said booster output member upon brake releasing operation to move said pistons to their brake release positions with said second piston engaging their stop, thus eliminating the requirement of one pressurizing piston return spring in said master cylinder, and to operatively move said brake pedal to the brake release pedal rest position and deenergize said solenoids.

4. A master cylinder assembly comprising:

a housing having a bore section provided with a bore extending axially therein and containing first and second pressurizing pistons and first and second pressurizing chambers, first and second transverse housing sections extending laterally outward from said housing bore section and respectively having first and second passages therein each extending into said housing bore section and transversely intersecting one of said pressurizing chambers, each of said passages having one end adapted to be connected to a brake circuit, first and second reservoir mounting bosses respectively extending upwardly from said first and second transverse housing sections at laterally outward locations relative to said housing bore section and respectively having third and fourth passages transversely intersecting the other ends of said passages within said first and second transverse housing sections, a brake fluid reservoir mounted on said bosses and having first and second ports in respective brake fluid communication with said third and fourth passages, and first and second normally closed valves respectively in said first and second passages fluidly between said pressurizing chambers and said third and fourth passages;

and means including first and second solenoid means for closing and opening said first and second valves in response to brake pedal actuation and release such that said valves are closed when said solenoid means are energized in response to brake pedal actuation and are opened when said solenoid means are deenergized in response to brake pedal release to a no-brake position.

5. A master cylinder assembly having a short overall length and compensation valve mechanism actuatable without lost pedal travel, said master cylinder assembly comprising:

a housing having a bore section provided within a bore extending axially therein and containing first and second pressurizing pistons and first and second pressurizing chambers, each of said pistons having a single seal reciprocably and continuously sealing said pistons relative to the wall of said bore so as to require a short overall piston axial length and consequently contribute to the short overall master cylinder length, first and second transverse housing sections extending laterally outward from said housing bore section and respectively having first and second passages therein each extending into said housing bore section and transversely intersecting one of said pressurizing chambers, each of said passages having one end adapted to be connected to a brake circuit, first and second reservoir mounting bosses respectively extending upwardly from said first and second transverse housing sections at laterally spaced locations relative to said housing bore section and respectively having third and fourth passages transversely intersecting the other ends of said passages within said first and second transverse housing sections, a brake fluid reservoir mounted on said bosses and having first and second ports in respective brake fluid communication with said third and fourth passages, and first and second normally closed valves respectively in said first and second passages fluidly between said pressurizing chambers and said third and fourth passages;

and means including first and second solenoid means respectively mounted externally on said first and second transverse housing sections for closing and opening said first and second valves in response to initial brake pedal actuation and full brake pedal release such that said valves are closed when said solenoid means are energized in response to initial brake pedal actuation before pressurizing piston movement occurs and are opened when said solenoid means are deenergized in response to brake pedal release to a no-brake position after pressurizing piston movement ceases;

the positioning of said valves and said means for closing and opening said valves out of said bore, and said means for closing and opening said valves being responsive to brake pedal actuation and release rather than any axial movement of said pistons, further contributing to the short overall master cylinder length.

6. In a brake operating assembly having a short overall length booster and master cylinder arrangement, a brake pedal and a master cylinder and a brake booster, said master cylinder comprising:

a housing with a bore therein defining a cylinder, first and second pressurizing pistons reciprocably received in said cylinder and defining therewith a primary pressurizing chamber between said pistons and a secondary pressurizing chamber forward of said second piston, each of said pistons having a single seal continuously sealing said pistons relative to the wall of said bore so as to require a short overall piston axial length and permitting said primary pressurizing chamber to extend axially immediately adjacent one bore end when the master cylinder is in the released position and consequently contributing to the short overall length of the booster and master cylinder arrangement, a first piston return spring acting between said pistons and being the only piston return spring in said cylinder, means limiting separative movement of said pistons, a stop extending into said cylinder and engageable with said second piston to limit rearward movement of said second piston, first and second ports respectively continuously connected with said primary and secondary pressurizing chambers and adapted for respective connection to first and second brake circuits, a brake fluid reservoir having first and second port means respectively communicating with said first and second ports, said first and second port means each having a normally closed check valve therein which when closed resists brake fluid flow from said reservoir to said respective pressurizing chambers and prevents brake fluid flow from said respective pressurizing chambers to said reservoir, means for holding said check valves closed during brake pedal operation for braking action and for opening said valves and holding said check valves open during brake pedal rest at full brake release, and operating means for said last-named means including solenoids energizable and deenergizable respectively in response to initial brake pedal brake operating movement before any pressurizing piston movement occurs and return to the full brake release positions after return movements of the pressurizing pistons are completed;

said brake booster having a power wall, an output member formed by said primary piston and secured to said power wall, and a power wall return spring which acts through said power wall and said booster output member upon brake releasing operation to move said pressurizing pistons to their brake release positions with said second pressurizing piston engaging said stop and thus eliminate the requirement of one pressurizing piston return spring in said master cylinder and to operatively move said brake pedal to the brake release pedal rest position and deenergize said solenoids.

* * * * *

UNITED STATES PATENT AND TRADEMARK OFFICE
CERTIFICATE OF CORRECTION

PATENT NO. : 4,445,330
DATED : May 1, 1984
INVENTOR(S) : Wolfgang Melinat

It is certified that error appears in the above—identified patent and that said Letters Patent is hereby corrected as shown below:

Column 7, line 42, delete "their" and insert -- said --.

Column 10, line 15, delete "positions" and insert -- position --.

Signed and Sealed this

Twentieth Day of November 1984

[SEAL]

Attest:

Attesting Officer

GERALD J. MOSSINGHOFF

Commissioner of Patents and Trademarks